United States Patent
Corrigan et al.

(10) Patent No.: US 10,243,785 B1
(45) Date of Patent: Mar. 26, 2019

(54) ACTIVE MONITORING OF BORDER NETWORK FABRICS

(71) Applicant: Amazon Technologies, Inc., Seattle, WA (US)

(72) Inventors: John Corrigan, Dublin (IE); Karl Andre McCabe, Dublin (IE); Eoin Francis Cavanagh, Dublin (IE)

(73) Assignee: Amazon Technologies, Inc., Seattle, WA (US)

(*) Notice: Subject to any disclaimer, the term of this patent is extended or adjusted under 35 U.S.C. 154(b) by 198 days.

(21) Appl. No.: 15/182,133

(22) Filed: Jun. 14, 2016

(51) Int. Cl.
*G06F 11/00* (2006.01)
*H04J 1/16* (2006.01)
*H04L 12/26* (2006.01)
*H04L 12/24* (2006.01)

(52) U.S. Cl.
CPC ...... *H04L 41/0677* (2013.01); *H04L 43/0823* (2013.01); *H04L 43/10* (2013.01); *H04L 43/50* (2013.01)

(58) Field of Classification Search
CPC . H04L 41/0677; H04L 43/50; H04L 43/0823; H04L 43/10

USPC ............... 370/244, 241, 241.1, 242
See application file for complete search history.

(56) References Cited

U.S. PATENT DOCUMENTS

| 2006/0171322 | A1 | 8/2006 | Lee |
| 2015/0030021 | A1* | 1/2015 | Maleck ............... H04L 63/1441 370/389 |
| 2016/0219024 | A1* | 7/2016 | Verzun ................. H04L 63/102 |
| 2016/0352633 | A1* | 12/2016 | Kapadia ................. H04L 45/64 |

* cited by examiner

*Primary Examiner* — Chuong T Ho
(74) *Attorney, Agent, or Firm* — Klarquist Sparkman, LLP (57) ABSTRACT

Technologies are provided for active monitoring of network fabrics, such as border network fabrics. For example, test packets can be generated and sent to destination devices within the network fabrics. The test packets can have destination ports that have been identified as closed destination ports. The success of the test packets can be determined based on whether ICMP error packet responses are received. If a network problem is detected based on results of the test packets, then traceroute packets can be used to identify the location of the network problem.

19 Claims, 7 Drawing Sheets

ACTIVE MONITORING OF BORDER NETWORK FABRICS

BACKGROUND

Computer networks generally comprise various interconnected computing devices that can communicate with each other via network packets to exchange data. When small numbers of devices are interconnected, the devices can be directly connected to each other. For example, one device can be directly connected to another device via a network link and the devices can communicate by sending packets to one another over the network link. However, direct connections between large numbers of devices is not scalable. Thus, the connections between large numbers of devices will typically be via indirect connections. For example, one device can be connected to another device via an interconnection network comprising one or more routers.

An interconnection network can be created from a small number of large routers. However, large routers can be expensive and a small number of them may provide limited redundancy. Instead, an interconnection network can be constructed from lower cost commodity equipment interconnected as a network fabric. A network fabric can include multiple nodes interconnected by multiple network links. A node can include a networking device that can originate, transmit, receive, forward, and/or consume information within the network. For example, a node can be a router, a switch, a bridge, an endpoint, or a host computer. The network fabric can be architected or organized as a topology of the nodes and links of the communication system. For example, the network fabric can be organized as a multi-tier network fabric such that a packet traversing the network fabric passes through multiple intermediary nodes associated with the different tiers of the multi-tier network.

An operator of a network fabric may desire to provide high availability and throughput through the network fabric. Thus, the operator may monitor the components of the network fabric for indications of dropped or lost packets, service degradation, component failures, or congestion within the network fabric. However, monitoring such a network fabric can be a difficult task due to the large number of network devices and links, and it can be difficult to detect and isolate network problems.

DETAILED DESCRIPTION

The following description is directed to technologies for active monitoring of network fabrics, such as border network fabrics. In some implementations, monitoring involves sending user datagram protocol (UDP) test packets to destination devices in the border network fabric. The UDP test packets are addressed to particular destination devices and have destination ports that have been identified as closed destination ports. Based on results of the UDP test packets, potential network problems within the border network fabric can be identified. Specifically, if the UDP test packet is successfully received by the destination, an Internet control message protocol (ICMP) error packet response will be received. However, if the UDP test packet is not successfully received, then another type of response packet will be received (other than the ICMP error packet response). In addition, the UDP test packet is determined to be unsuccessful if no response is received (e.g., indicating that the UDP test packet did not reach the destination or a response did not return from the destination, both of which can indicate a problem with the border network fabric). If a potential network problem is detected, then traceroute packets can be used to identify the location of the problem (e.g., a particular network device or network link).

The technologies described herein are implemented within the context of network fabrics, such as multi-tiered network fabrics. A network fabric is a collection of network devices and resources (e.g., routers, switches, hubs, links, etc.), which can be organized according to various topologies. For example, a network fabric can include a multi-stage network with a plurality of stages. A multi-stage network is a network in which network devices (e.g., routers and/or switches) are organized into a plurality of stages. One type of multi-stage network is a tiered network such as a Clos network (also called a Clos network fabric or a Clos fabric). The network devices in a given stage forward traffic between the network devices in the previous stage and network devices in the next stage. In some types of multi-stage networks, the network devices in a given stage are fully meshed with the network devices in an adjacent stage (e.g., each router in a first stage is connected to every router in a second stage). In other types of multi-stage networks, the network connections between stages are not fully meshed (e.g., a router in a given stage may not be connected to every other router in an adjacent stage). As another example, groups of network devices in adjacent stages can be interconnected within the group, but not interconnected between groups.

As used herein, the term network fabric refers to one or more collections of networking resources (e.g., routers, switches, hubs, network links, etc.) that are connected to each other, each of which may have a different topology. For example, a network fabric may include collections of networking resources that all have the same topology, or may include different groupings of networking resources of various topologies (e.g., some multi-tiered networks and some networks that are not multi-tiered).

The technologies described herein can be implemented within the context of a border network fabric (also called a border network), which is a network fabric with a particular purpose. A border network refers to a network that connects a local collection of computing resources (which can include computers, servers, networking devices, database systems, storage systems, local network fabrics, and/or other types of computing resources) to external networks. For example, a border network can connect computing resources of a data center or local geographical region to external networks such as the Internet or other types of external networks (e.g., private networks linked to other data centers).

A network fabric can include network devices organized into a number of layers. For example, a border network fabric can be organized into a number of layers supporting traffic flow from local computing resources to external networks (e.g., primarily up/down network flow that travels out from the local computing resources to the external networks or in from the external networks to the local computing resources). Each layer can include network devices organized according to a particular topology (e.g., a multi-tiered network or a network with another topology). Example layers include transit layers, distribution layers, core layers, and aggregation layers.

Monitoring a network fabric, such as a border network fabric, can be difficult. For example, in some monitoring solutions for network fabrics, custom agents are used that are deployed within the network fabrics. However, using custom agents within the network fabric can result in security issues (e.g., maintaining custom agents that are not protected by firewalls), provisioning issues, and/or maintenance issues. As another example, some monitoring solutions employ traceroutes for detecting network problems. However, use of traceroutes as a primary detection mechanism can result in increased traceroute traffic that negatively impacts operation of the network fabric and some network configurations may limit the frequency of traceroutes. In addition, traceroutes may not effectively test the large number of paths that can be present within the network fabric.

Using the technologies described herein, active monitoring of network fabrics, such as border network fabrics, can be performed efficiently and effectively. For example, monitoring agents can be efficiently deployed externally to the network fabrics being monitored. By deploying the monitoring agents externally (e.g., within a local network external to a border network fabric) the monitoring agents can be more easily deployed, secured (e.g., behind firewall and other networking security appliances), and maintained. The monitoring agents can then monitor the network fabrics with reduced impact on the operation on the network fabrics. For example, the monitoring agents can use test packets (e.g., UDP and/or transmission control protocol (TCP) based ping packets, which could use IPv4 and/or IPv6) to monitor various network devices and their associated network links, which can have less of a network impact than attempting to monitor with traceroutes. When a potential problem is detected, the monitoring agents can employ traceroutes to locate the source of the problem. By only using traceroutes when a problem is detected, the impact on the network fabric can be reduced.

The monitoring agents can monitor the network fabrics without needing specialized monitoring devices within the network fabrics. For example, the monitoring agents can send test packets to any device with an Internet protocol (IP) network stack (e.g., router, switch, computer, etc.) within the network fabric. In this way, the monitoring agents can be located at only one end of the path (monitoring agents are not needed at the destination side).

In some implementations, the monitoring agents are located externally to the network fabric. For example, the monitoring agents (e.g., software monitoring agents, hardware monitoring agents, or monitoring agents implemented using a combination of software and hardware) can be located on a network that is separate from, but connected to, the network fabric. In some implementations, the monitoring agents are software agents running on hosts that are connected to a border network fabric. For example, the hosts can be part of a network fabric separate from, but connected to, the border network fabric (e.g., where the hosts utilize the border network fabric to communicate with external networks, such as the Internet). The monitoring agents can be located behind firewall devices and/or other networking devices that provide network security for the monitoring agents.

The monitoring agents monitor the network fabric by sending test packets to various destination devices within the network fabrics. The test packets (e.g., UDP based ping packets or TCP based ping packets) are addressed to destination devices (using IP addresses associated with the destination devices) and have destination ports that have been identified as closed destination ports. For example, the monitoring agents can be pre-configured with destination port numbers that are known to be closed on the destination devices of the network fabric, and the monitoring agents can use one of the closed port numbers in the destination port field of the header of the test packets. As another example, the monitoring agents can obtain the closed destination port numbers dynamically (e.g., from a configuration server).

If a test packet is successfully received by the destination device on the closed destination port, then an ICMP error packet will be sent back to the monitoring agent. Typically, the ICMP error packet will indicate that the destination port is unreachable (e.g., an ICMP message type 3 "destination unreachable" packet with the code value of 3 "destination port unreachable"). However, another type of ICMP error packet can also be received in some situations, such as when the destination host is congested (e.g., an ICMP message type 4 "source quench" packet with the code value of 0 "source quench"). Both types of ICMP error packets (destination port unreachable and the source quench) indicate that the test packet was received by the destination. If the ICMP error packet response is then received by the monitoring agent, the test packet is considered successful (a successful round-trip test of the network devices and links along the particular path taken by the test packet to the destination device, and the ICMP response from the destination device, in the network fabric).

If a response to a test packet is something other than an ICMP error packet (destination port unreachable or source quench), then the test packet is considered unsuccessful. For example, a response packet may be received by the monitoring device indicating that the destination network is unreachable (e.g., due to a network link or routing issue). For example, these other types of responses can indicate that the test packet did not reach the destination device.

If no response to the test packet is received (e.g., within a timeout period), then the test packet is considered unsuccessful. The lack of a response can be caused by the test packet not reaching the destination device (e.g., due to a networking link or routing issue, a hardware failure of a network device, etc.) or a response not reaching the monitoring agent (e.g., due to a networking link or routing issue, a hardware failure of a network device, etc.).

When a problem with the network fabric is detected, then the monitoring agent can use traceroute packets to identify the location of the problem. A problem can be detected, for example, based on the number or rate of unsuccessful test packets (e.g., when the rate of unsuccessful test packets reaches a threshold value, such as over a threshold percentage over a 10 second period). In some implementations, the traceroute packets use the same header parameters as the test packets and/or the same overall packet size so that the traceroute packets will be routed along the same path as the test packets. The location of the network problem can be identified based on the location where the traceroutes stop (also called partial traceroutes). For example, if the traceroutes reach a particular router, and further destinations along the path (e.g., the next hop router) fail to respond to the traceroutes, then the location can be identified as the next hop network link, next hop network device, and/or an associated routing or configuration issue at or near the location where the traceroutes fail.

In some implementations, traceroute information is maintained for various paths of the network fabric. For example, the traceroute information can include weights for the various network devices along the paths (e.g., network devices along good traceroute paths can be weighted higher). When identifying the location of a network problem, the weights can be used. For example, a partial traceroute may have a number of possible next-hop network devices to reach a particular destination device. In order to determine the likely next-hop network device that is the source of the network problem, the weights can be used to exclude those next-hop network devices that have a high weight (e.g., over a threshold weight, indicating that they have had successful traceroutes). Those next-hop network devices that remain can be considered as potential sources of the network problem.

Environments for Actively Monitoring Network Fabrics

In any of the implementations described herein, network fabrics (e.g., border network fabrics) can be actively monitored. For example, monitoring agents (e.g., software monitoring agents) can employ test packets (e.g., UDP and/or TCP ping packets) to detect potential problems with the monitored network fabrics. The test packets can be addressed to destination devices within the network fabrics and have destination ports that have been identified as closed destination port numbers. The source of the network problems can be identified using traceroutes.

Figure 1:
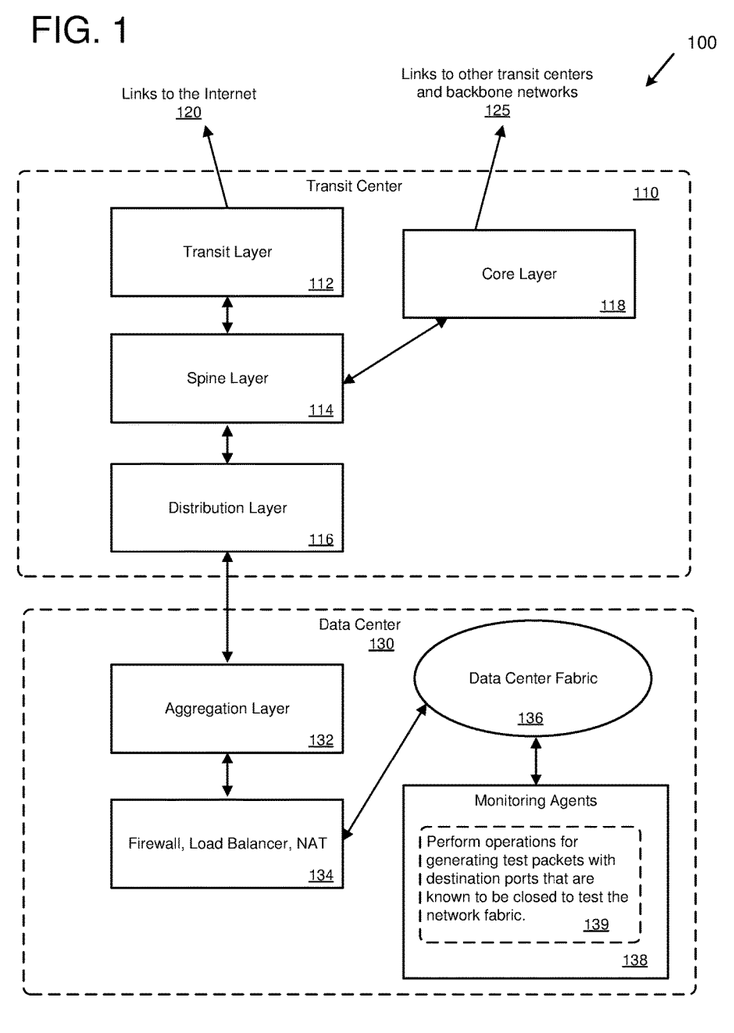
FIG. 1 is a diagram of an example network environment in which border network fabrics are monitored by monitoring agents.

FIG. 1 is a diagram of an example environment 100 in which border network fabrics are monitored by monitoring agents. For example, the environment 100 can represent a collection of computing resources (e.g., servers, networking devices, network links, etc.) located at a particular geographical location (e.g., supporting a data center environment).

As depicted in the environment 100, the computing resources are organized into a transit center 110 and a data center 130. The transit center 110 contains network devices and associated computing resources supporting network communication between the data center 130 and various external networks, such as links to the Internet 120 and links to other transit centers and backbone networks 125. The transit center 110 contains a number of layers of network devices. Specifically, the transit center 110 contains a transit layer 112, a spine layer 114, a distribution layer 116, and a core layer 118. The transit layer 112 provides transit and peering to external networks, such as links to the Internet 120. The spine layer 114 provides connectivity between other layers of the transit center 110. The distribution layer 116 provides connectivity between the transit center 110 and the data center 130. The core layer 118 provides connectivity to other networks which may be associated with the same business or organization, such as the links to other transit centers and backbone networks 125. In other implementations, the transit center 110 may comprise more, or fewer, layers than those depicted, and/or may contain layers other than those depicted.

The data center 130 comprises an aggregation layer 132, a collection of firewall, load balancer, and network address translation (NAT) resources 134, a data center fabric 136, and monitoring agents 138. The aggregation layer 132 aggregates network traffic for the various computing resources of the data center 130. For example, the data center 130 may be organized into different collections of computing resources, which could represent different rooms or buildings of the data center 130. The firewall, load balancer, and NAT resources 134 provide network traffic management and security for the data center fabric 136 and other computing resources connected to the data center fabric 136, such as the monitoring agents 138. The data center fabric (e.g., a multi-tiered network such as a Clos network) provides connectivity for the computing resources of the data center 130 (e.g., server computers, database resources, storage resources, etc.).

The monitoring agents 138, which can be software and/or hardware agents, monitor the various network layers of the data center 130 and the transit center 110. As depicted at 139, the monitoring agents 138 perform operations for generating test packets with destination ports that are known to be closed in order to test the various layers of the network fabric, including the layers of the transit center 110 and the data center 130. For example, the monitoring agents 138 can send test packets (e.g., UDP test packets) to particular network devices (e.g., routers) within the various layers (e.g., to routers located within the transit layer 112).

In some implementations, the layers of the transit center 110 along with the aggregation layer 132 and the firewall, load balancer, and NAT resources 130, form a border network fabric. The monitoring agents 138 are located externally to the border network fabric and perform operations for monitoring the border network fabric.

In some implementations, the monitoring agents 138 test the border network fabric using UDP test packets, which are addressed to destination devices within the border network fabrics (e.g., network devices at various layers of the border network fabric, such as the transit layer 112) and that have destination ports that have been identified as closed destination ports. The monitoring agents 138 send the UDP test packets to the destination devices and collect results. A UDP test packet is considered to be successful when an ICMP error packet response is received, which indicates that the UDP test packet was successfully received by the destination device and produced the expected response message. A UDP test packet is considered to be unsuccessful if either a different response is received (other than the expected ICMP error packet response) or no response is received (e.g., within a timeout period, which could be a number of seconds for example). An unsuccessful UDP test packet indicates a potential network problem, such as a link that is not operating properly (e.g., the link may be down, have intermittent connection problems, or be congested) and/or a device that is not operating properly (e.g., a router with a hardware problem, a congestion issue, a routing or configuration issue, etc.).

The monitoring agents 138 can send many UDP test packets to various parts of the border network fabric in order to fully test the border network fabric or portions of the border network fabric. In addition, the monitoring agents 138 can vary parameters of the UDP test packets to ensure that the UDP test packets are spread (e.g., spread evenly or equally) among the various paths within the border network fabric. For example, the monitoring agents 138 can vary source and destination port numbers so that various paths are tested (e.g., utilizing equal-cost multi-path (ECMP) routing).

Figure 2:
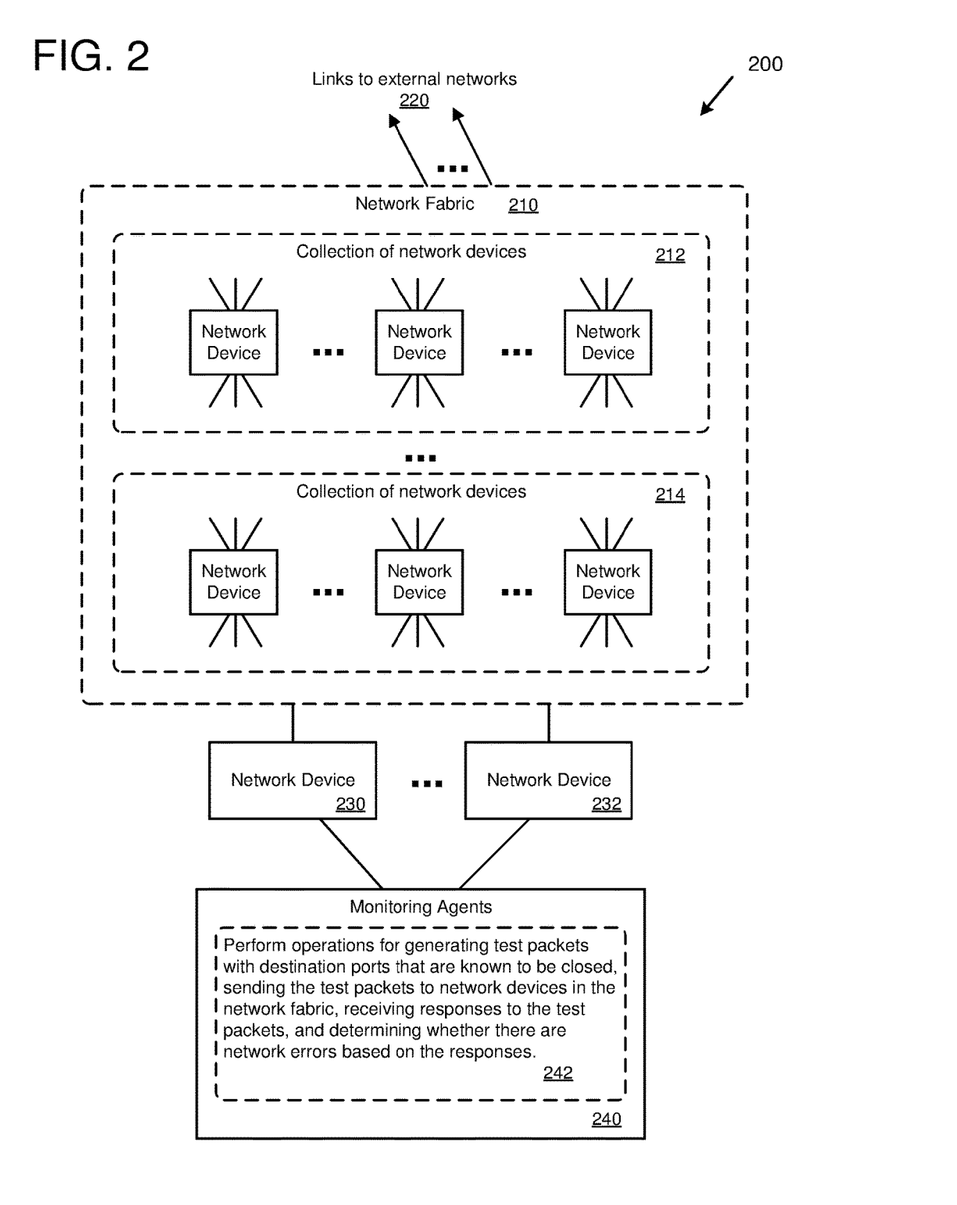
FIG. 2 is a diagram depicting an example network environment for monitoring network fabrics by monitoring agents.

FIG. 2 is a diagram of an example environment 200 for monitoring network fabrics by monitoring agents. For example, the environment 200 can represent a collection of computing resources (e.g., servers, networking devices, network links, etc.) located at a particular location, such as a data center.

The example environment 200 includes a network fabric 210. The network fabric 210 contains various collections of network devices, as depicted by example collections of network devices 212 and 214, and associated resources organized into various topologies. For example, the network fabric 210 can contain one or more individual networks each having their own topology (e.g., one or more multi-tiered networks and/or one or more other types of networks). In some implementations, the network fabric 210 contains a number of layers of network devices. For example, the collection of network devices 212 could be a transit layer of a border network fabric.

The network fabric 210 is connected to external networks, as depicted at 220. For example, the external networks can include links to the Internet, links to other network fabrics, links to backbone networks, etc.

The network fabric 210 is connected to one or more monitoring agents 240. The monitoring agents 240 (e.g., software monitoring agents running on host computers) can be connected to the network fabric 210 via one or more network devices (e.g., network devices 230 and 232) or connected in another manner (e.g., directly connected to network devices within the network fabric 210). While the monitoring agents 240 are located externally to the network fabric 210, in other implementations one or more monitoring agents can be located within the network fabric 210.

The monitoring agents 240, which can be software and/or hardware agents, monitor the network fabric 210. As depicted at 242, the monitoring agents 240 perform operations for generating test packets with destination ports that are known to be closed in order to test the various network devices of the network fabric 210. For example, the monitoring agents 240 can send test packets (e.g., UDP test packets) to particular network devices (e.g., routers) within the network fabric 210. The monitoring agents 240 can determine whether the test packets are successful based on ICMP error response packets. When the results of the testing indicate a network problem within the network fabric 210, the monitoring agents 240 can use traceroute packets to identify the location of the network problem.

Methods for Actively Monitoring Network Fabrics

In any of the technologies described herein, methods can be provided for actively monitoring network fabrics, including border network fabrics and other types of network fabrics. Monitoring can be performed using test packets (e.g., UDP and/or TCP ping packets) sent to destination devices and using destination ports that have been identified as closed ports.

Figure 3:
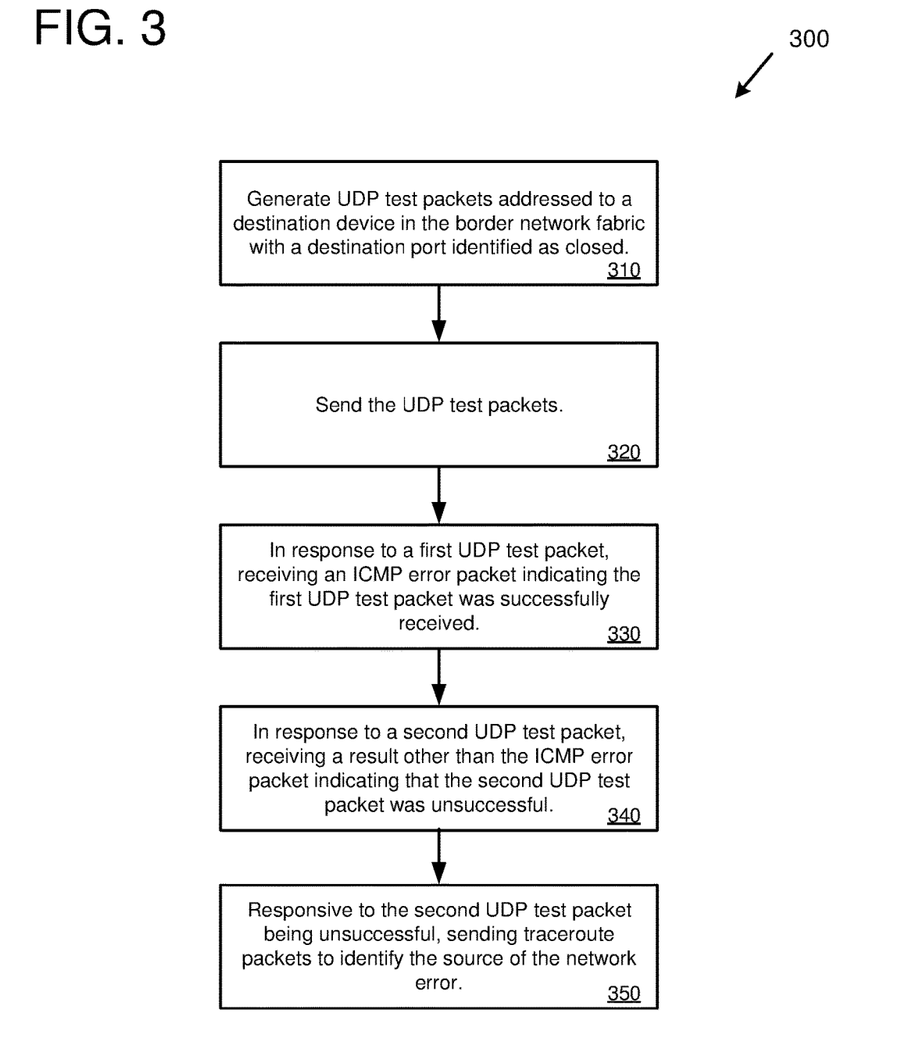
FIG. 3 is a flowchart of an example method for monitoring border network fabrics using user datagram protocol (UDP) test packets.

FIG. 3 is a flow chart of an example method 300 for monitoring border network fabrics using UDP test packets. The example method 300 can be performed by a monitoring agent (e.g., a software monitoring agent) located externally to the network fabric.

At 310, UDP test packets are generated by a monitoring agent. The UDP test packets are addressed to a destination device within the border network fabric and have a destination port that has been identified as a closed destination port.

At 320, the UDP test packets are sent for delivery to the destination device. For example, the monitoring agent can generate the UDP test packets and provide them to a network interface for transmission via a network link connected, directly or via intermediate networks, to the border network fabric.

At 330, in response to a first UDP test packet, an ICMP error packet is received indicating that the first UDP test packet was successfully received by the destination device. At 340, in response to a second UDP test packet, a result other than the ICMP error packet is received (e.g., either a response packet other than the ICMP error packet or no response within a timeout period) indicating that the second UDP test packet was unsuccessful.

At 350, responsive to the unsuccessful second UDP test packet, traceroute packets are sent to identify the source of the network error within the border network fabric. In some implementations, the decision to send traceroute packets is based on the number of UDP test packets that are unsuccessful over a period of time.

Figure 4:
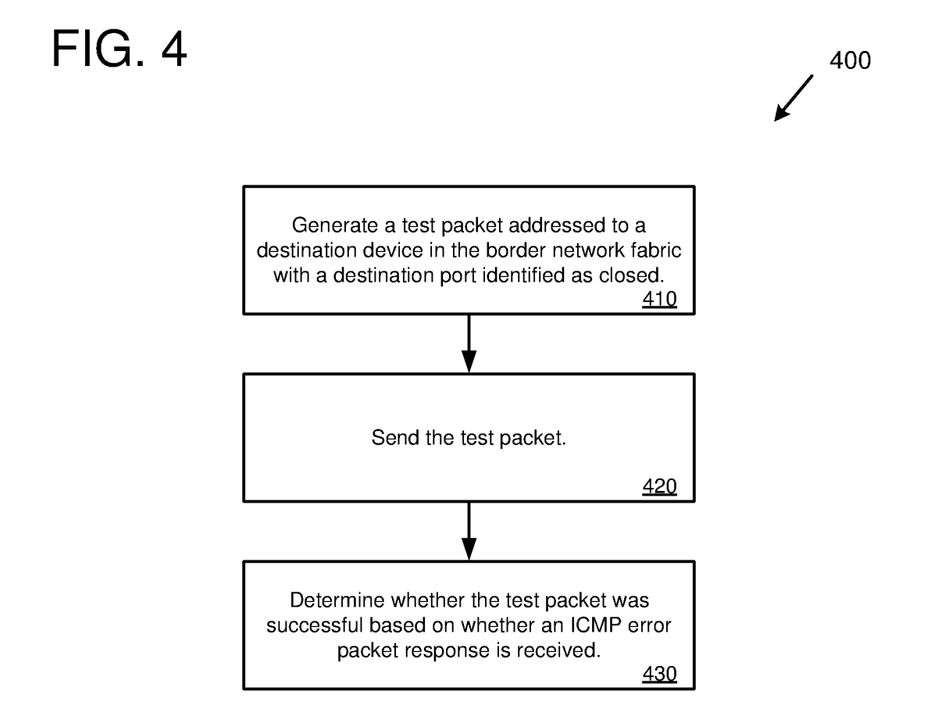
FIG. 4 is a flowchart of an example method for monitoring network fabrics using test packets.

FIG. 4 is a flow chart of an example method 400 for monitoring network fabrics (e.g., border network fabrics or other types of network fabrics) using test packets (e.g., UDP and/or TCP based ping packets). The example method 400 can be performed by a monitoring agent (e.g., a software monitoring agent) located externally to the network fabric.

At 410, a test packet is generated (e.g., by a monitoring agent located externally to the network fabric). The test packet is addressed to a destination device within the network fabric and has a destination port that has been identified as a closed destination port.

At 420, the test packet is sent for delivery to the destination device. For example, the monitoring agent can generate the test packet and provide it to a network interface for transmission via a network link connected, directly or via intermediate networks, to the network fabric.

At 430, a determination is made as to whether the test packet was successful. The determination is based on whether an ICMP error packet response is received. For example, if an ICMP error packet is received, then the test packet is determined to be successful, and otherwise (e.g., a response other than an ICMP error packet is received or no response is received) the test packet is determined to be unsuccessful.

Figure 5:
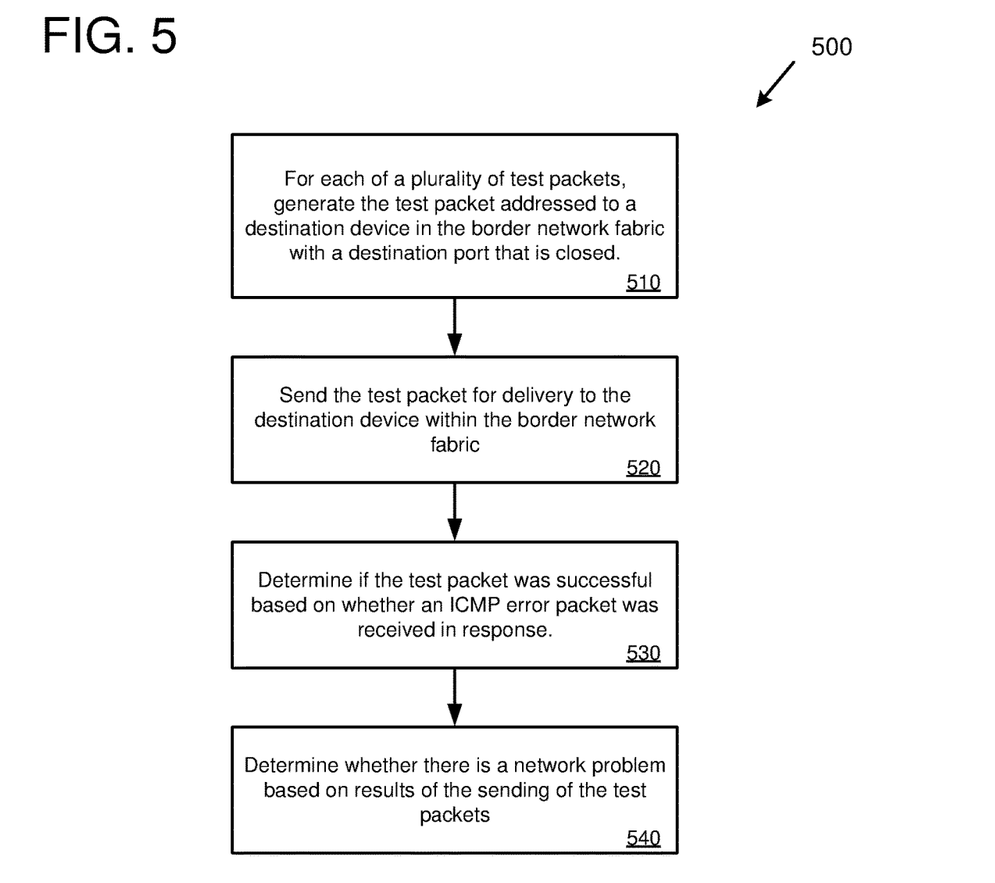
FIG. 5 is a flowchart of an example method for monitoring network fabrics using multiple test packets.

FIG. 5 is a flow chart of an example method 500 for monitoring border network fabrics using test packets (e.g., UDP and/or TCP based ping packets). The example method 500 can be performed by a monitoring agent (e.g., a software monitoring agent) located externally to the border network fabric.

At 510, a plurality of test packets are generated. The test packets are addressed to a respective destination device in the border network fabric and have a respective destination port that has been identified as a closed destination port. For example, the test packets can be distributed among a number of destination devices and/or a number of destination ports (e.g., to distribute the test packet among the network devices and links of the border network fabric).

At 520, the plurality of test packets are sent for delivery to the destination device within the border network fabric. For example, the monitoring agent can generate the test packets and provide them to a network interface for transmission via a network link connected, directly or via intermediate networks, to the border network fabric.

At 530, a determination is made as to whether the plurality of test packet were successful. The determination is based on whether an ICMP error packet response is received for each of the test packets. For example, if an ICMP error packet is received for a given test packet, then the test packet is determined to be successful, and otherwise (e.g., a response other than an ICMP error packet is received or no response is received) the test packet is determined to be unsuccessful.

At 540, a determination is made as to whether there is a network problem within the border network fabric based on results of the sending of the test packets (e.g., indications of successful versus unsuccessful test packets). For example, a network problem can be determined to exist when a threshold number or percentage of unsuccessful test packets occurs over a given time period (e.g., a number of seconds). When a network problem is determined, then the location of the network problem can be identified using traceroute packets.

Once a location of a network problem has been identified, an indication of the network problem can be output. For example, the location of the network problem can be sent to a monitoring system (e.g., a monitoring service used by network administrators), emailed, sent as an instant message, or communicated in another manner. As another example, an indication of the network problem can be sent as an alert or alarm.

Example Service Provider Environments

Figure 6:
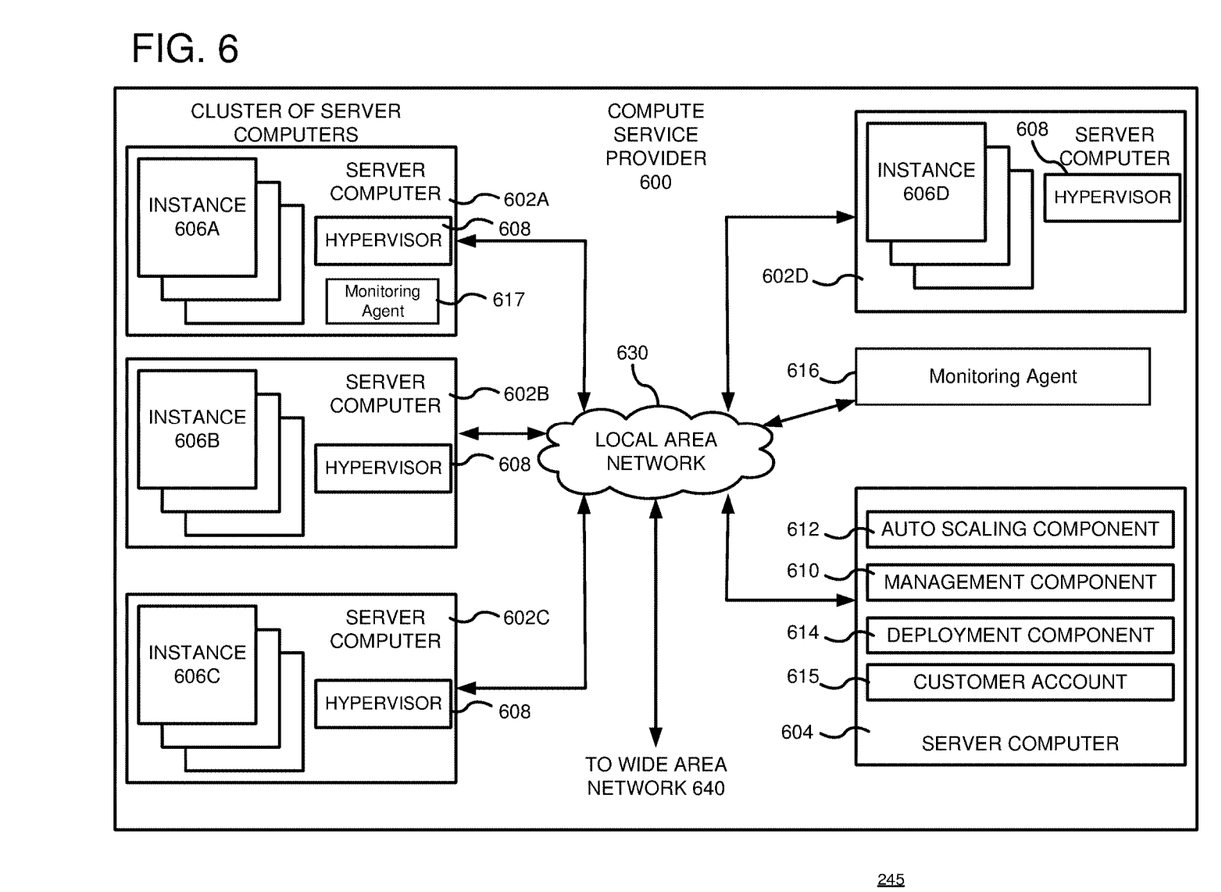
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example, each of the servers 602A-602D can be configured to execute a hypervisor 608 or another type of program configured to enable the execution of multiple instances 606 on a single server. For example, each of the servers 602A-602D can be configured (e.g., via the hypervisor 608) to support one or more virtual machine slots, with each virtual machine slot capable of running a virtual machine instance (e.g., server computer 602A could be configured to support three virtual machine slots each running a corresponding virtual machine instance). Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can comprise a Clos network. The network 630 can be a local area network (LAN), such as a multi-tiered network (e.g., Clos network), and can be connected to a wide area network (WAN) 640 so that end users can access the compute service provider 600. The wide area network 640 can connect to a border network fabric providing access to the internet and/or to other networks (e.g., peering connections to other network locations). It should be appreciated that the network topology illustrated in FIG. 6 has been simplified and that many more networks and networking devices can be utilized to interconnect the various computing systems disclosed herein.

In some implementations, a monitoring agent 616 performs operations for actively monitoring network fabrics, such as a network fabric (e.g., a border network fabric) connected to the wide area network 640. For example, the monitoring agent 616 can be a software monitoring agent running on a host computer. The monitoring agent 616 can send test packets to monitor the network fabric, analyze results, detect potential network problems, and identify the location of the network problems within the network fabric. Monitoring agents can also run on one or more of the server computers 602A-602D. For example, monitoring agent 617 can be a software monitoring agent running on server computer 602A (e.g., running on one of the instances 606A).

Figure 7:
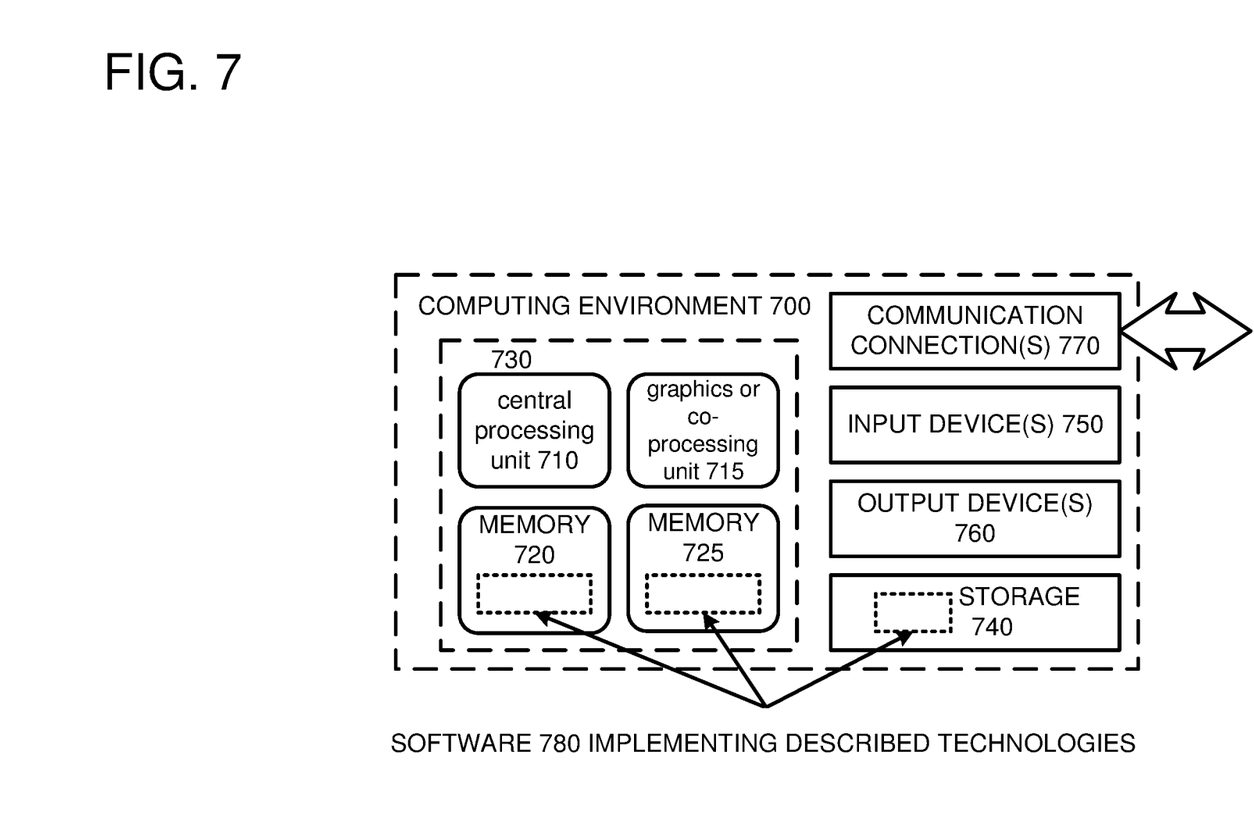
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a computing system, for monitoring border network fabrics, the method comprising:
   generating, by a network monitoring agent located outside a border network fabric, user datagram protocol (UDP) test packets, wherein the UDP test packets:
   are addressed to a destination device in the border network fabric and
   have a destination port that has been identified as a closed destination port;
   sending, by the network monitoring agent, the UDP test packets for delivery to the destination device;
   in response to a first UDP test packet, receiving an Internet control message protocol (ICMP) error packet that indicates the first UDP test packet was successfully received by the destination device, wherein an ICMP error packet is one of a destination port unreachable ICMP error packet or a source quench ICMP error packet;
   in response to a second UDP test packet sent after the first UDP test packet, receiving a result that is other than an ICMP error packet, the result indicating that the second UDP test packet was not successful; and
   responsive to determining that the second UDP test packet was not successful, sending traceroute packets to identify a source of a network error within the border network fabric.

2. The method of claim 1 wherein the result of the second UDP test packet that is other than an ICMP error packet response comprises:
   a response packet other than an ICMP error packet; and
   a lack of a response packet received during a timeout period.

3. The method of claim 1 wherein the border network fabric comprises a multi-stage network with a plurality of stages, wherein each stage of the multi-stage network comprises a plurality of switches or routers.

4. The method of claim 1 wherein the border network fabric comprises:
   a transit layer of network devices, the transit layer providing transit and peering to external networks;
   a distribution layer of network devices, the distribution layer managing traffic flow for multiple data center areas; and
   an aggregation layer of network devices, the aggregation layer aggregating traffic for each of the data center areas.

5. The method of claim 4 wherein the destination device of the UDP test packets is a network device in the transit layer.

6. A computing device comprising:
   a processor; and
   a network interface;
   wherein the computing device is configured to perform operations for monitoring network fabrics, the operations comprising:
   for each of a plurality of test packets:
   generating the test packet, wherein the test packet:
   is addressed to a destination device in a network fabric; and
   has a destination port that is a closed destination port;
   sending, via the network interface, the test packet for delivery to the destination device in the network fabric; and
   determining if the test packet was successful based on whether an Internet control message protocol (ICMP) error packet response is received;
   wherein the test packet is successful if the ICMP error packet is received in response to the test packet;

wherein the test packet is unsuccessful if:
a response to the test packet is received indicating a response other than the ICMP error packet, which indicates a network problem within the network fabric; or
a response to the test packet is not received within a timeout period, which indicates a network problem within the network fabric.

7. The computing device of claim 6, the operations further comprising:
calculating a rate of unsuccessful test packets over a period of time; and
when the rate of unsuccessful test packets is over a threshold value, sending traceroute packets to identify a location of a network problem within the network fabric.

8. The computing device of claim 7 wherein the traceroute packets are configured to use header parameters and overall packet size of the test packets.

9. The computing device of claim 6 wherein the computing device is located external to the network fabric.

10. The computing device of claim 6 wherein the destination device is any computing device within the network fabric with an Internet Protocol (IP) network stack.

11. The computing device of claim 6 wherein the network fabric is a border network fabric that has multiple layers.

12. The computing device of claim 11 wherein the multiple layers comprise a transit layer, and wherein the destination device to which the test packet is addressed is in the transit layer.

13. The computing device of claim 6 wherein the test packet is one of a user datagram protocol (UDP) ping packet or a transmission control protocol (TCP) ping packet.

14. A method comprising:
for each of a plurality of test packets:
generating, by a monitoring agent, the test packet, wherein the test packet is:
addressed to a respective destination device in a border network fabric; and
has a respective destination port that is a closed destination port;
sending, by the monitoring agent, the test packet for delivery to the destination device in the border network fabric;
determining if the test packet was successful based on whether a response received to the test packet is an Internet control message protocol (ICMP) error packet; and
determining whether there is a network problem within the border network fabric based on results of the sending of the test packets.

15. The method of claim 14 wherein the test packet is one of a user datagram protocol (UDP) ping packet or a transmission control protocol (TCP) ping packet.

16. The method of claim 14 wherein the plurality of test packets are configured to vary network paths taken within the border network fabric by varying one or both of the destination port among a plurality of closed destination ports or a source port among a plurality of source ports.

17. The method of claim 14 wherein the network monitoring agent is a software agent running on a host external to the border network fabric.

18. The method of claim 14 wherein determining whether there is a network problem within the border network fabric comprises:
calculating a rate of unsuccessful test packets over a period of time; and
when the rate of unsuccessful test packets is over a threshold value, determining that there is a network problem.

19. The method of claim 14 wherein when a network problem is determined, sending traceroute packets to identify a location of the network problem within the border network fabric.

* * * * *